United States Patent
Rotem et al.

(10) Patent No.: US 9,092,210 B2
(45) Date of Patent: Jul. 28, 2015

(54) CONTROLLING CURRENT TRANSIENTS IN A PROCESSOR

(75) Inventors: Efraim Rotem, Haifa (IL); Nir Rosenzweig, Givat Ella (IL); Doron Rajwan, Rishon le-Zion (IL); Nadav Shulman, Tel Mond (IL); Alon Naveh, Ramat Hasharon (IL); Eliezer Weissmann, Haifa (IL); Michael Zelikson, Haifa (IL)

(73) Assignee: Intel Corporation, Santa Clara, CA (US)

(*) Notice: Subject to any disclaimer, the term of this patent is extended or adjusted under 35 U.S.C. 154(b) by 742 days.

(21) Appl. No.: 13/307,529

(22) Filed: Nov. 30, 2011

(65) Prior Publication Data
US 2012/0166854 A1 Jun. 28, 2012

(51) Int. Cl.
G06F 1/30 (2006.01)
G06F 1/28 (2006.01)
G06F 1/32 (2006.01)

(52) U.S. Cl.
CPC .. *G06F 1/30* (2013.01); *G06F 1/28* (2013.01); *G06F 1/3206* (2013.01)

(58) Field of Classification Search
CPC .................................................. G06F 1/3206
See application file for complete search history.

(56) References Cited

U.S. PATENT DOCUMENTS

| | | | |
|---|---|---|---|
| 7,603,576 B2 * | 10/2009 | Johns et al. | 713/322 |
| 2004/0119521 A1 * | 6/2004 | Kurd et al. | 327/291 |
| 2006/0020831 A1 * | 1/2006 | Golla et al. | 713/300 |
| 2006/0020838 A1 * | 1/2006 | Tschanz et al. | 713/322 |
| 2009/0063065 A1 * | 3/2009 | Weekly | 702/64 |
| 2009/0300329 A1 * | 12/2009 | Naffziger et al. | 712/205 |

* cited by examiner

*Primary Examiner* — Paul Yanchus, III
*Assistant Examiner* — Joshua Nevelin
(74) *Attorney, Agent, or Firm* — Trop, Pruner & Hu, P.C.

(57) ABSTRACT

In one embodiment, a processor includes a core with a front end unit, at least one execution unit, and a back end unit. Multiple voltage drop detectors can be located within the core each to output a voltage drop signal when a detected voltage falls below a threshold voltage. In turn, a current transient logic coupled to receive the voltage drop signals can control a micro-architectural parameter of at least one of the front end unit, execution unit and back end unit responsive to receipt of a voltage drop signal. Other embodiments are described and claimed.

17 Claims, 8 Drawing Sheets

US 9,092,210 B2

CONTROLLING CURRENT TRANSIENTS IN A PROCESSOR

BACKGROUND

As integrated circuit device scaling continues, current levels consumed by a device such as a processor continue to increase due to a number of factors including: an increase in the number of transistors per unit area on a die; introduction of new performance features; an increase in the number of cores in a processor; and reduction in supply voltage while the power envelope remains constant.

Among the deleterious impacts of increased current are the need to design a higher power voltage regulator and system power supply, the need for higher voltage to compensate for IR droop, an increase in the number of capacitors required and the need for better voltage regulators to supply higher current with faster feedback mechanisms. Guard banding is a technique that compensates for expected maximum current (Icc), degradation caused by factors such as excess current, and may involve degrading threshold voltage or increasing operating voltage ($V_{DD}$), among other things. However, these mechanisms can lead to increased power consumption.

DETAILED DESCRIPTION

In various embodiments, mechanisms can be provided to detect current transients that can affect power delivery to a processor, leading to a voltage droop. Different mechanisms can be provided. For example, in some embodiments an analog detection of a current transient can occur, while in other embodiments a micro-architectural-based detection of a current transient can be performed. It is also possible that multiple detection modes can be present in a given processor and used together to detect a current transient.

As described above, such current transients can occur rapidly, e.g., on the order of nanoseconds, and can affect processor reliability, both by causing an instantaneous voltage droop that can affect the correct execution of core circuitry, as well as potentially leading to long-term reliability issues due to voltage overshoots caused by load release, over a lifetime of the processor. Note the terms "current transient" and "transient current" are equivalent and refer to a rapid change in current consumption (as a derivative function of di/dt) by processor circuitry, either in an increased or decreased manner.

Figure 1:
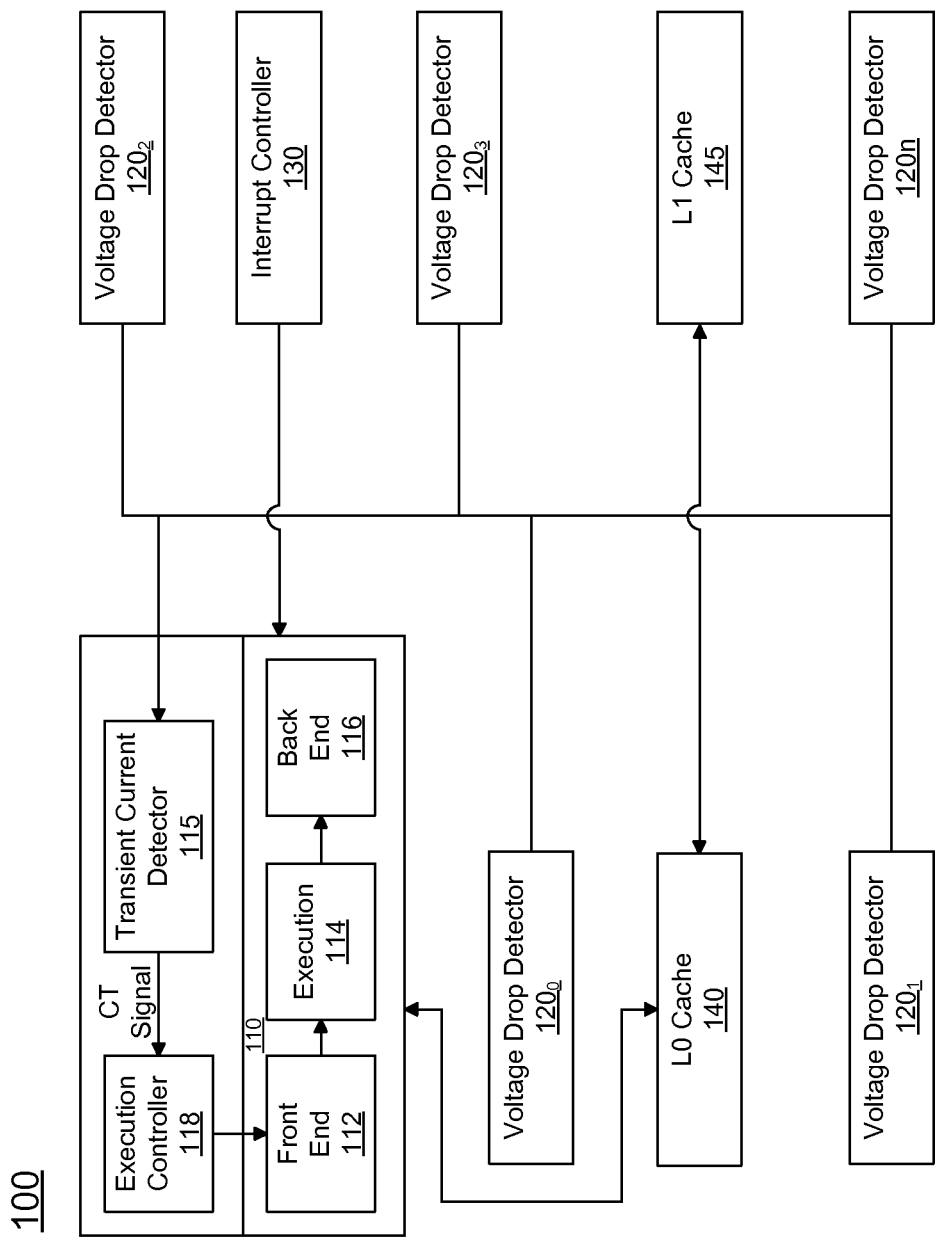
FIG. 1 is a block diagram of an analog detection mechanism in accordance with one embodiment of the present invention.

Referring now to FIG. 1, shown is a block diagram of an analog detection mechanism in accordance with one embodiment of the present invention. Shown in FIG. 1 is a core 100 of a processor such as a multicore processor. Understand that although only a single core is shown for ease of illustration in the embodiment of FIG. 1, multiple cores can be present. As seen, core 100 includes a pipeline 110 including a front end unit 112, an execution unit 114 and a back end unit 116. In general, these units can be used to perform instruction fetching, decoding, execution, and retirement, among other operations.

As further seen, pipeline 110 can include a transient current detector 115, which is configured to receive information from multiple voltage detectors within the core. In turn, when a transient current is detected by detector 115, a current transient signal can be sent to an execution controller 118. Responsive to this current transient signal, execution controller 118 can undertake one or more micro-architectural actions to aid in reducing current consumption in a relatively instantaneous manner. More particularly as shown, execution controller 118 can send signals to front end unit 112 to cause variation in micro-architectural execution within the front end unit. In turn, this can reduce current consumption both in that unit as well as the remaining portions of the pipeline as instructions flow through the pipeline. In front end unit 112, the operation limits the rate at which the instructions are decoded or issued. Alternatively, the signals can be communicated to execution unit 114 to similarly cause a variation in a micro-architectural execution.

In various embodiments, execution controller 118 may be configured to rapidly respond to detected transient currents by adjusting operation of pipeline 110 at the level of micro-operations. As is known, the execution of a program consists of the sequential execution of instructions. Each instruction is executed during an instruction cycle made up of shorter sub-cycles (e.g., fetch, decode, execute, retire). The performance of each sub-cycle involves one or more shorter operations, which may be generally referred to as micro-operations (μops).

In some embodiments, the input rate of μops executed by the core for each cycle may be reduced responsive to a detected current transient. This may take place within a single core clock cycle or very few core clock cycles so that processing can be slowed within a very short period, such as within nanoseconds of when transient current detector 115 detects a current transient. In this manner, processor 100 may prevent an excess current associated with certain micro-architectural events that may otherwise result.

Examples of slowing down operation (throttling) of a core that can be initiated include reducing the rate at which μops can be executed in execution unit 114. For example the number of instructions per cycle can be reduced from four instructions per cycle to two instructions per cycle, or from four instructions per cycle to three instructions per cycle.

In some embodiments, in addition to performing a throttling of the core by adjusting μop issuance rate, execution controller 118 may send information regarding the detected current transient to other processor circuitry. For example, execution controller 118 may alert a power control unit (not shown in FIG. 1) as to the throttling action initiated on a given core. In some embodiments, after this first, fast action response to the current transient, the power control unit may initiate a second, slower and more global response to the actual or potential current transient. Thus the power control unit may take one or more global actions to further adjust operation of the core in question, according to an evaluation of the information received from execution controller 118 as well as other information concerning the present state of the core. These actions may include (when an increase in current consumption is detected), a reduction in core clock frequency, an increase of a guard band voltage, or other actions, as described further below. As used herein, the term "guard band voltage" means a voltage at which a processor or portion thereof is configured to operate, and which is higher than a minimum operating voltage for which the processor is specified.

As further seen in FIG. 1, a plurality of voltage detectors 120a-120n can be provided within the core. More specifically, these voltage detectors can be configured as voltage drop detectors. In general, these voltage detectors can perform voltage detection, and provide an output to transient current detector 115 upon detection of a voltage droop of a predetermined threshold. That is, each detector can include a filtering mechanism such that a notification signal is sent from the detector to transient current detector 115 only when a drop of a given magnitude has occurred. This drop information can be in the form of a derivative, e.g., the detector detects a relatively high speed drop regardless of the steady state DC drop. Note that the voltage detectors can be provided at various locations within a core. For example, as seen in FIG. 1, voltage detectors 120 can be coupled close to cache memories such as a level 0 and level 1 caches 140 and 145 within the core. Similarly, the detectors can be coupled close to other circuitry of the core such as an interrupt controller 130. In still other embodiments, one or more other voltage drop detectors can be located externally to the cores, and even externally to a processor, with the information being provided back to an execution controller such as in FIG. 1.

Note that by providing the voltage detectors near areas that operate at relatively steady state and typically do not undergo variable current consumption in their internal operation, these detectors can be good indicators of a global voltage drop. Furthermore, by providing multiple such detectors within a core, an even better prediction of a global voltage drop can be provided. Note that the magnitude of the voltage drop to be detected by the detectors can be based on a threshold voltage drop. This threshold value can be programmable in various embodiments. Thus by providing these multiple voltage detectors spread around a core, voltage drops that are detected may be caused by an incapability of a power delivery system, such as a voltage regulator that provides a regulated voltage to the processor, of maintaining a steady voltage.

In the embodiment of FIG. 1, transient current detector 115 can be configured to raise the transient current signal when a predetermined number of the voltage detectors have provided a voltage drop signal within a given time interval. For example, assume there are five voltage detectors within a core and further assume that the time interval is on the order of approximately 10 nanoseconds (ns). When at least some predetermined number of these five voltage detectors generate a voltage drop signal within the interval, transient current detector 115 can generate the transient current signal. Of course other values can be used in different embodiments. Although shown with this particular implementation in the embodiment of FIG. 1, understand the scope of the present invention is not limited in this regard.

Figure 2:
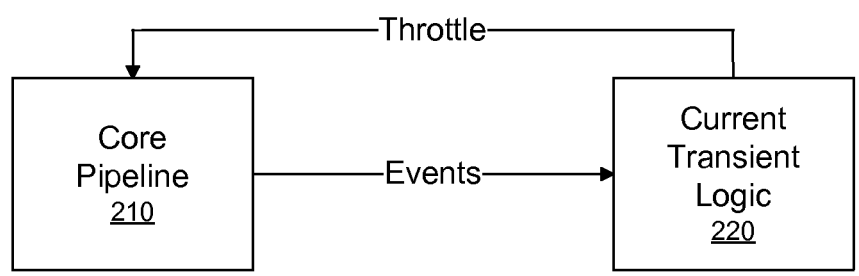
FIG. 2 is a block diagram of a micro-architectural-based transient current detector in accordance with an embodiment of the present invention.

In some embodiments, such as for fast-developing current events (on the order of nanoseconds or less), detection may take place by monitoring micro-architectural events to determine if certain events exceed a threshold, e.g., using a micro-architectural detection mechanism. For example, this detection mechanism can be based on detection of various micro-architectural events occurring within the processor. Referring now to FIG. 2, shown is a block diagram of a micro-architectural-based transient current detector in accordance with an embodiment of the present invention. As seen in FIG. 2, a portion of a processor 200 is shown, namely a core pipeline 210 that may include the various units shown above in FIG. 1, e.g., front end, execution and back end units. Accordingly, these units can receive macro-instructions, convert them into one or more μops and execute the μops to thus obtain result data, which can be provided to a memory subsystem, e.g., initially at least to a local cache memory of the core (not shown for ease of illustration in FIG. 2).

To perform current transient detection and control of the pipeline accordingly, a current transient logic 220 can be provided. Specifically, logic 220 is configured to receive incoming events from core pipeline 210. Note that different types of events can be provided. However for purposes of illustration assume that the events can correspond to μops to be executed within the pipeline. Current transient logic 220 can, based upon the μops and additional information such as the corresponding data widths of the operands on which the μops are to be performed, determine whether it is possible for a current transient to occur. As an example, detection of a voltage droop can be realized by a micro-operation counter that has counted a threshold number of micro-operations of a given type within a predetermined interval. Or the counter can be configured to maintain a count value of a number of micro-operations to be executed within the pipeline in an evaluation interval, and current transient logic 220 can control one or more micro-architectural parameters responsive to receipt of the counter value. In this way, the counter can act as a voltage drop detector.

In various embodiments processor 200 may be operable to throttle operation of one or more units of pipeline 210 according to multiple limits for currents. Each limit may be associated with a set of micro-architectural events. In other words, a given limit may be established for a particular set of events that may be composed of one or more micro-architectural events. The one or more micro-architectural events may correspond to events known to be associated with activity that gives rise to high currents. Such events may be the result of benign operations or may be the result of malicious code. Examples of micro-architectural events (also termed "events" hereinafter unless otherwise indicated) that may serve as the basis for triggering action by a current limit mechanism include micro-architectural instructions such as LOAD, STORE, ADD, SUBTRACT, MULT, SHIFT, AND, etc. In various embodiments, current transient logic 220 may be configured to detect vector operations, including floating point operations, such as floating point multiply operations, and others. Other vector operations may include adding two vectors to produce a third vector, subtracting two vectors to produce a third vector, loading a vector from memory, and storing a vector to memory. These and other micro-architectural events may be particularly likely to give rise to increased currents and thus such events to be performed in a core can be monitored to prevent undesirable current excursions.

Thus as an example, a current transient can be detected when certain predetermined μops are received as events. Such μops can correspond to instructions that consume high amounts of power. These instructions can be associated with very wide data widths such as vector-based operations. In particular processor implementations, one or more vector instructions of an instruction set architecture (ISA) such as an advanced vector (AVX) instruction set extension of an INTEL™ architecture (IA) processor can be deemed to be high power consumption instructions and thus can trigger a detection of an actual or likely current transient. Responsive to receipt of such instructions in current transient logic 220, the logic can cause a current transient signal to be sent to core pipeline 210. This current transient signal can be a throttle signal to initiate a change in the micro-architectural operation of one or more portions of core pipeline 210 to thus manage consumption, e.g., by reducing power consumption. Note that high power μops can come from the use of extended ISA instructions such as AVX instructions, or from the translation of legacy ISA instructions into high bandwidth μops, such as a string copy.

In one particular embodiment, an instruction issuer of a front end unit of the pipeline can be throttled, e.g., by reducing the number of instructions that can be provided per clock cycle. Assume a processor has a four-wide instruction per cycle bandwidth. When this throttle signal is received, the instruction issuer can be controlled to only issue two instructions per cycle. In this way, the pipeline will handle a reduced number of instructions per cycle, thus reducing power consumption. Note however that this reduced power consumption also reduces instruction throughput and thus reduces processor performance. Accordingly, embodiments can be configured to perform this throttling for relatively short periods of time. The length of time that a throttle mode is enabled by current transient logic 220 can be programmable. In some embodiments this length of time can be in the range of few tens to less than 200 core clock cycles. Further this limited throttle duration can be realized, because a current transient is likely to only occur for a relatively short duration. This is so, as a voltage regulator that provides a regulated voltage to the processor can detect the voltage drop with a feedback mechanism of the voltage regulator and control the voltage accordingly so that the current transient can be resolved. Note that the throttling may be lifted in a gradual manner, in order not to initiate a transient current.

In various embodiments, current transient logic 220 can include a table of events such as μops or other events that can cause a current transient. In this way, when incoming events are received in logic 220, a table lookup can be performed to determine whether the received event has a corresponding entry in the table. If so, a counter of the logic can be updated. When the count value of this counter reaches a threshold level, which can be programmable, the throttle signal can be raised. Note that when a given evaluation interval is completed, the counter value can be reset. Note that in other embodiments the counter can be a rolling average counter or saturating up/down counter. Although shown at this high level in the embodiment of FIG. 2, understand the scope of the present invention is not limited in this regard. For example, in other embodiments current transient logic 220 can be configured to maintain a count of μops to be executed within the execution unit in an evaluation interval and to issue the throttle signal when the count exceeds a threshold, which can be representative of an actual or likely current transient.

As described above, the micro-architectural throttling mechanisms can be time limited in duration and are meant to handle instantaneous current transients. If however these current transients continue to occur, it is likely that the processor is undergoing a highly intensive workload, and performance may be served better by increasing a guard band voltage at which the processor operates. By increasing the guard band voltage, it is likely that the number of current transients that cause a drop in voltage below an undesired level reduces. Accordingly, embodiments provide for a multi-stage approach to handling current transients. Namely the first stage is one of the above-described micro-architectural-based throttle control mechanisms. A second stage is a slower, more global handling in which a guard band voltage or other global configuration update to one or more operating parameters of the processor can be performed to mitigate the effects of current transients by ensuring that even when a current transient occurs, the resulting voltage drop does not cause the operating voltage to fall below a minimum threshold level. In various embodiments, a power control unit (PCU) or other power controller of a processor can be used to perform this second level of control.

Figure 3:
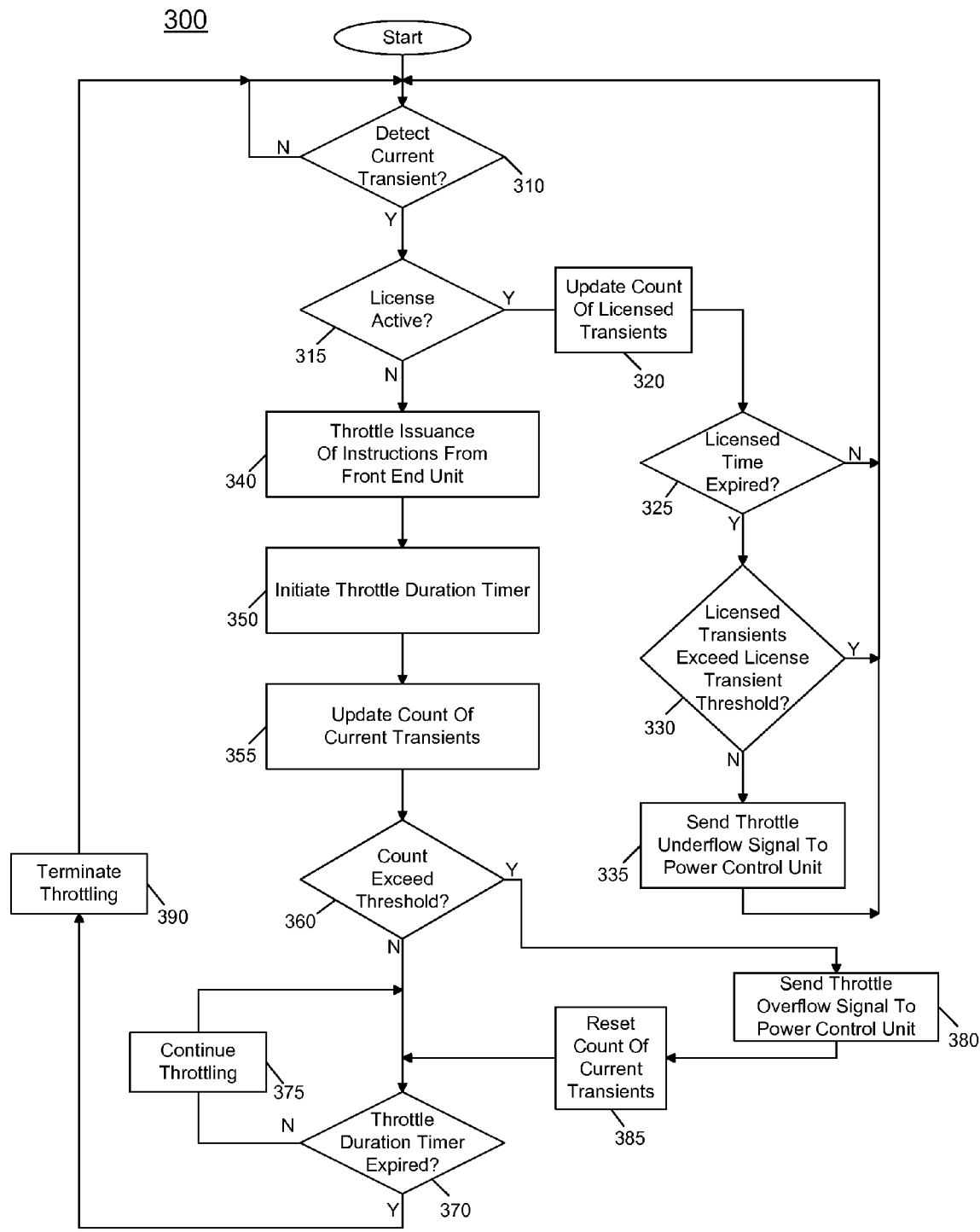
FIG. 3 is a flow diagram of a method for controlling current transients in accordance with an embodiment of the present invention.

Referring now to FIG. 3, shown is a flow diagram of a method for controlling current transients in accordance with an embodiment of the present invention. As shown in FIG. 3, method 300 can be implemented using logic internal to a core such as the analog-based and/or micro-architectural based current transient detection mechanisms described above. As seen in FIG. 3, method 300 can begin by determining whether a current transient is detected (diamond 310). If so, control passes to diamond 315 where it can be determined whether a license is active. This license may be an indication from a power control unit that the processor is operating at a higher guard band voltage and thus, at least some number of current transients is allowed to occur without performing any micro-architectural based, e.g., throttling control. The license thus acts as an indication of a higher guard band voltage level and an indication of permission to not perform a micro-architectural action such as instruction throttling responsive to a current transient detection. Thus if the license is active, control passes to block 320 where a count of licensed transients can be updated. Control passes next to diamond 325 where it can be determined whether the license time has expired. That is, a license that is provided from the PCU can be sent with a timestamp value such that the license is only valid for a given duration. If the license time has not expired, control passes to diamond 310 discussed above. If instead the license time has expired, control passes to diamond 330 where it can be determined whether the number of licensed transients has exceeded a license transient threshold at diamond 330. This license transient threshold may correspond to a relatively small count of current transients within the license time duration such that it may be possible to reduce a guard band voltage or perform an update to another global operating parameter without incurring excessive current transients. If the number exceeds this threshold, control passes back to diamond 310, discussed above. Otherwise, control passes to block 335 where a throttle underflow signal can be sent to the power control unit. This throttle underflow signal will be discussed further below.

Still referring to FIG. 3, if instead it is determined at diamond 315 that no license is active, control passes to block 340 where issuance of instructions from a front end unit of the processor can be throttled. Such throttling can be performed as above, e.g., by reducing the number of instructions allowed to issue per cycle from an instruction issuer. Control next passes to block 350 where a throttle duration timer can be initiated. This throttle duration timer thus corresponds to an amount of time that throttling is to be performed and can be a configurable value in various embodiments. Control next passes to block 355 where a count of detected current transients can be updated, e.g., by incrementing a counter. Next it can be determined whether this counter value exceeds a threshold (at diamond 360). This threshold may correspond to a count of current transients above which a global mechanism should be implemented to reduce the occurrence of current transients. If the count exceeds this threshold, control passes to block 380 where a throttle overflow signal can be sent to the PCU. This throttle overflow signal will be discussed further below. Thereafter, the count of current transients can be reset (block 385).

If instead at diamond 360 it is determined that the count does not exceed the threshold current transient count, control passes to diamond 370 where it can be determined whether the throttle duration timer has expired. If not, throttling continues (at block 375), and control loops back to diamond 370. When the timer expires, control passes to block 390, where throttling can be terminated, and control next passes back to diamond 310. Although shown with this particular implementation in the embodiment of FIG. 3, understand the scope of the present invention is not limited in this regard.

Figure 4:
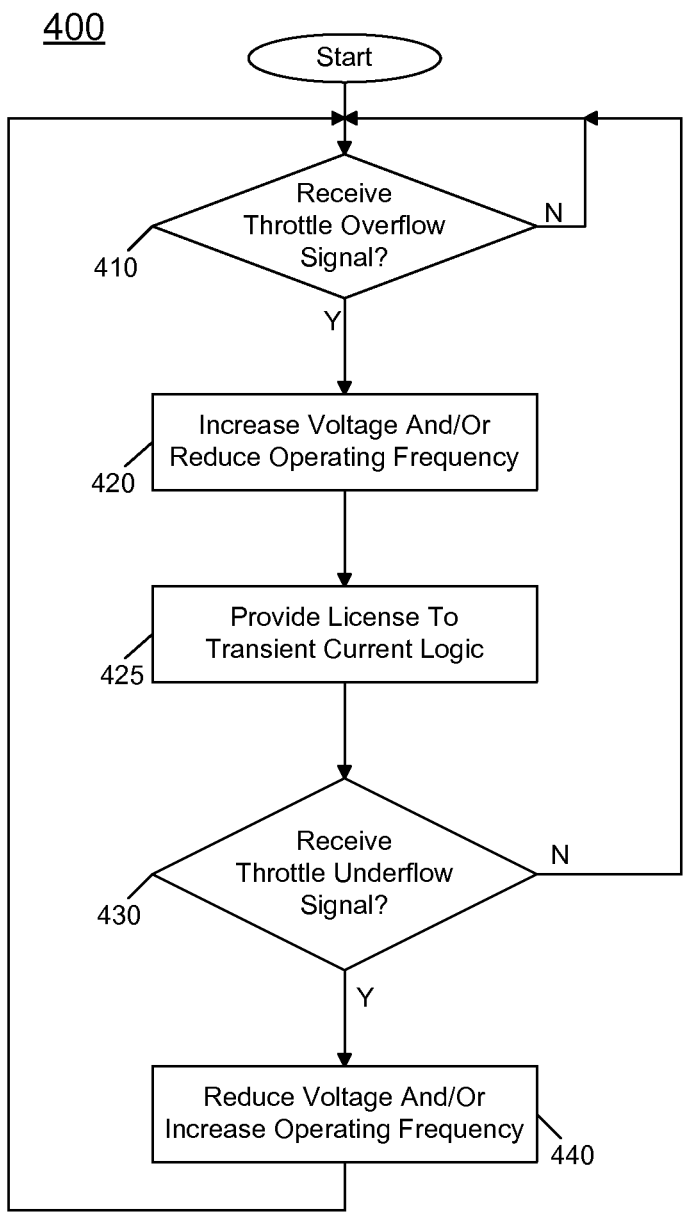
FIG. 4 is a flow diagram of a global current transient control method in accordance with an embodiment of the present invention.

Referring now to FIG. 4, shown is a flow diagram of a current transient control method that can be performed on a global basis, e.g., by a PCU, in accordance with an embodiment of the present invention. As shown in FIG. 4, method 400 can begin by determining whether a throttle overflow signal has been received from one or more cores (diamond 410). If so, control passes to block 420 where an update to one or more global operating parameters of the processor can occur. More specifically, a guard band voltage can be increased and/or an operating frequency of the processor can be reduced. In this way, although current transients may continue to occur, their effect on the processor can be mitigated, as at a higher operating voltage and/or at a lower operating frequency, the current transient will likely not cause a voltage drop that causes the operating voltage to drop below a minimum operating voltage level. Accordingly from that time the processor can operate with these updated parameters. In addition, responsive to the global operating parameter update, the PCU can signal a license to the current transient detection mechanism (block 425). In one embodiment, this license can be in terms of a time duration, e.g., a time stamp value, to indicate a length of time for which current transient detections can occur without taking a micro-architectural action.

Control then passes to diamond 430 where it can be determined whether a throttle underflow signal is received. This throttle underflow signal is thus an indication that current transients are not occurring at a significant level. Accordingly, if such an underflow signal is received from one or more cores, control passes to block 440 where an update to one or more global operating parameters of the processor can occur. More specifically, a guard band voltage can be decreased and/or an operating frequency of the processor can be increased. Although shown at this high level in the embodiment of FIG. 4, understand the scope of the present invention is not limited in this regard.

Figure 5:
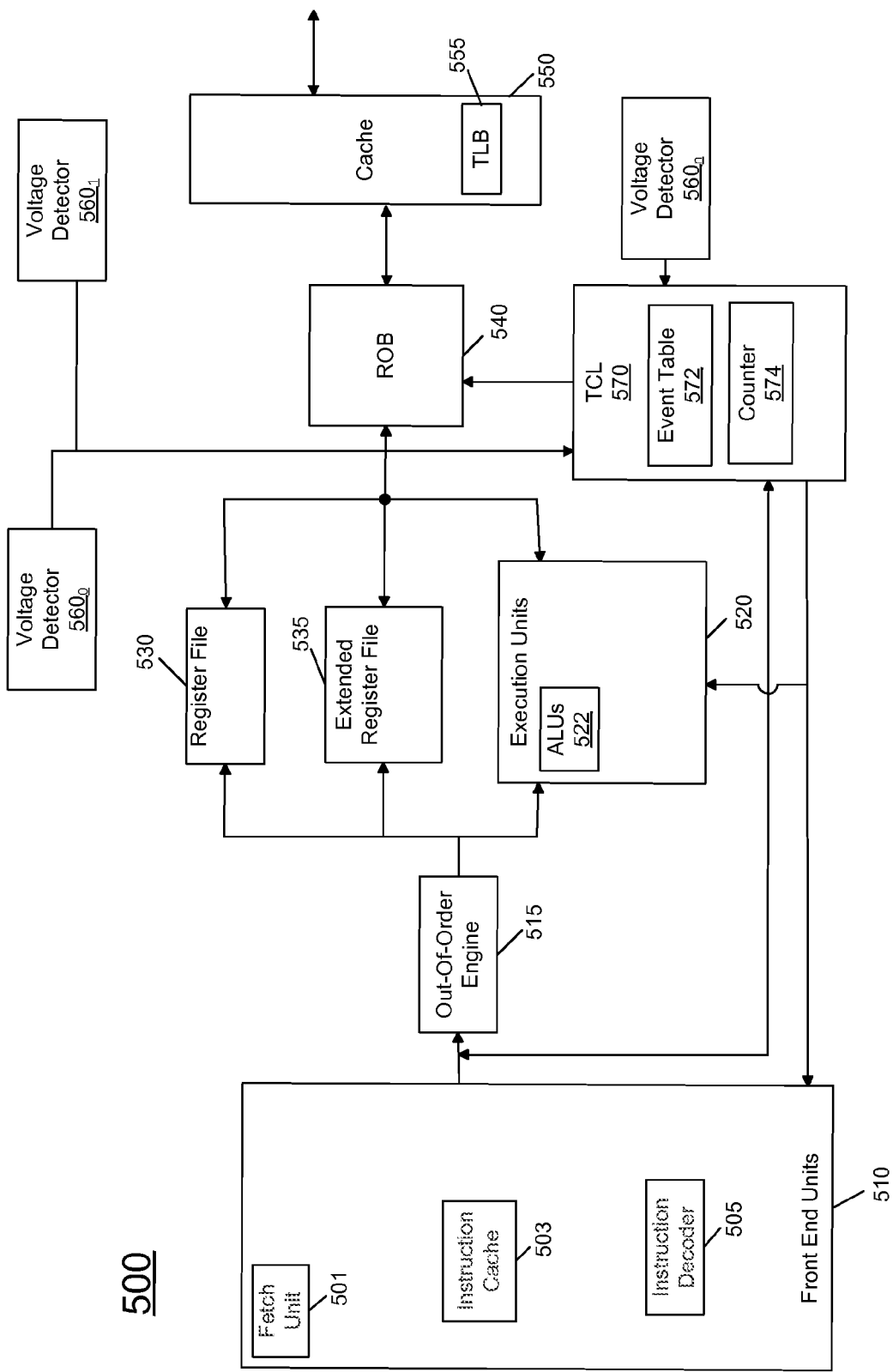
FIG. 5 is a block diagram of a processor core in accordance with one embodiment of the present invention.

Embodiments can be implemented in many different processor types. For example, embodiments can be realized in a processor such as a multicore processor. Referring now to FIG. 5, shown is a block diagram of a processor core in accordance with one embodiment of the present invention. As shown in FIG. 5, processor core 500 may be a multi-stage pipelined out-of-order processor. Processor core 500 is shown with a relatively simplified view in FIG. 5 to illustrate various features used in connection with current transient control in accordance with an embodiment of the present invention.

As shown in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives such as micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522.

When operations are performed on data within the execution units, results may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to cache 550 which, in one embodiment may be a low level cache (e.g., an L1 cache) and which may also include TLB 555, although the scope of the present invention is not limited in this regard. From cache 550, data communication may occur with higher level caches, system memory and so forth.

As further seen in FIG. 5, core 500 can include a transient current logic 570. As seen, this logic can be configured to receive voltage detection signals from multiple voltage detectors $560_0$-$560_n$. Note that these detectors can be located in portions of the core having a relatively steady state current consumption level. In addition, logic 570 can receive the instruction stream provided to out-of-order engine 515. Using one or both of these inputs, transient current logic 570 can determine whether a transient current is occurring or is likely to occur. In some implementations, transient current logic 570 can include an event table 572 that includes a list of, e.g., instruction types for which transient currents are likely to occur. As discussed above, in some embodiments these instruction types can correspond to various vector instructions. In addition, transient current logic 570 can include a counter 574, which can store a count of detected transient currents within an evaluation window. In some implementations as discussed above responsive to an overflow of this counter, e.g., corresponding to exceeding of a given threshold, the transient current logic can send a signal to a power control unit to seek a change in a global operating parameter to reduce the number of transient currents occurring.

As further seen in FIG. 5, transient current logic 570 can be coupled to the various units of the processor including front end units 510, execution units 520 and ROB 540. Responsive to detection of a transient current, logic 570 can cause a signal such as a throttle signal to at least one of these units to throttle its operation to thus reduce current consumption in a substantially instantaneous manner. Note that while the implementation of the processor of FIG. 5 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Furthermore, other embodiments may be implemented in a graphics processor. For implementation in a graphics processor, the detection and control can be done based on number of active execution units, special function blocks or so forth.

Figure 6:
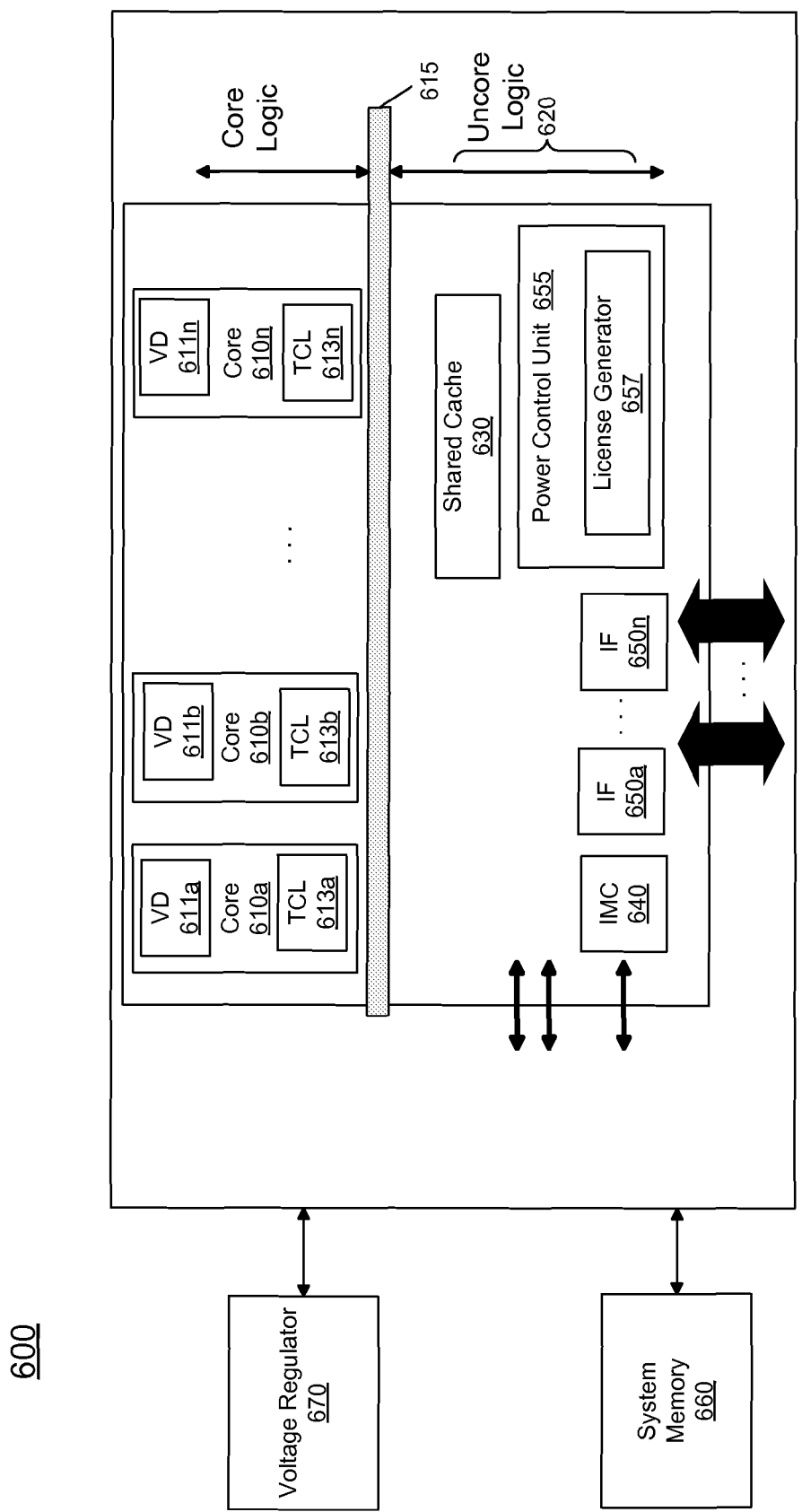
FIG. 6 is a block diagram of a processor in accordance with an embodiment of the present invention.

Referring now to FIG. 6, shown is a block diagram of a processor in accordance with an embodiment of the present invention. As shown in FIG. 6, processor 600 may be a multicore processor including a plurality of cores $610_a$-$610_n$. In one embodiment, each such core may be of an independent power domain and can be configured to operate at an independent voltage and/or frequency, and to enter turbo mode when available headroom exists. As seen, each core can include at least one voltage detector $611_a$-$611_n$ and a transient current logic $613_a$-$613_n$. The various cores may be coupled via an interconnect 615 to a system agent or uncore 620 that includes various components. As seen, the uncore 620 may include a shared cache 630 which may be a last level cache. In addition, the uncore may include an integrated memory controller 640, various interfaces 650 and a power control unit 655. In the embodiment of FIG. 6, power control unit 655 can include a license generator 657. In general, license generator 657 can be configured to generate a license to provide to one or more of the cores when a global operating parameter has been changed due to recurring current transients. In this way, the transient current logic within the core(s) can allow some number of transient currents to occur during the licensed period without triggering a micro-architectural control mechanism.

With further reference to FIG. 6, processor 600 may communicate with a system memory 660, e.g., via a memory bus. In addition, by interfaces 650, connection can be made to various off-chip components such as peripheral devices, mass storage and so forth. Also shown in FIG. 6 is a voltage regulator 670, which may be controlled, e.g., by PCU 655, to provide a regulated operating voltage to the processor in a manner to reduce and/or quickly respond to current transients. While shown with this particular implementation in the embodiment of FIG. 6, the scope of the present invention is not limited in this regard.

Figure 7:
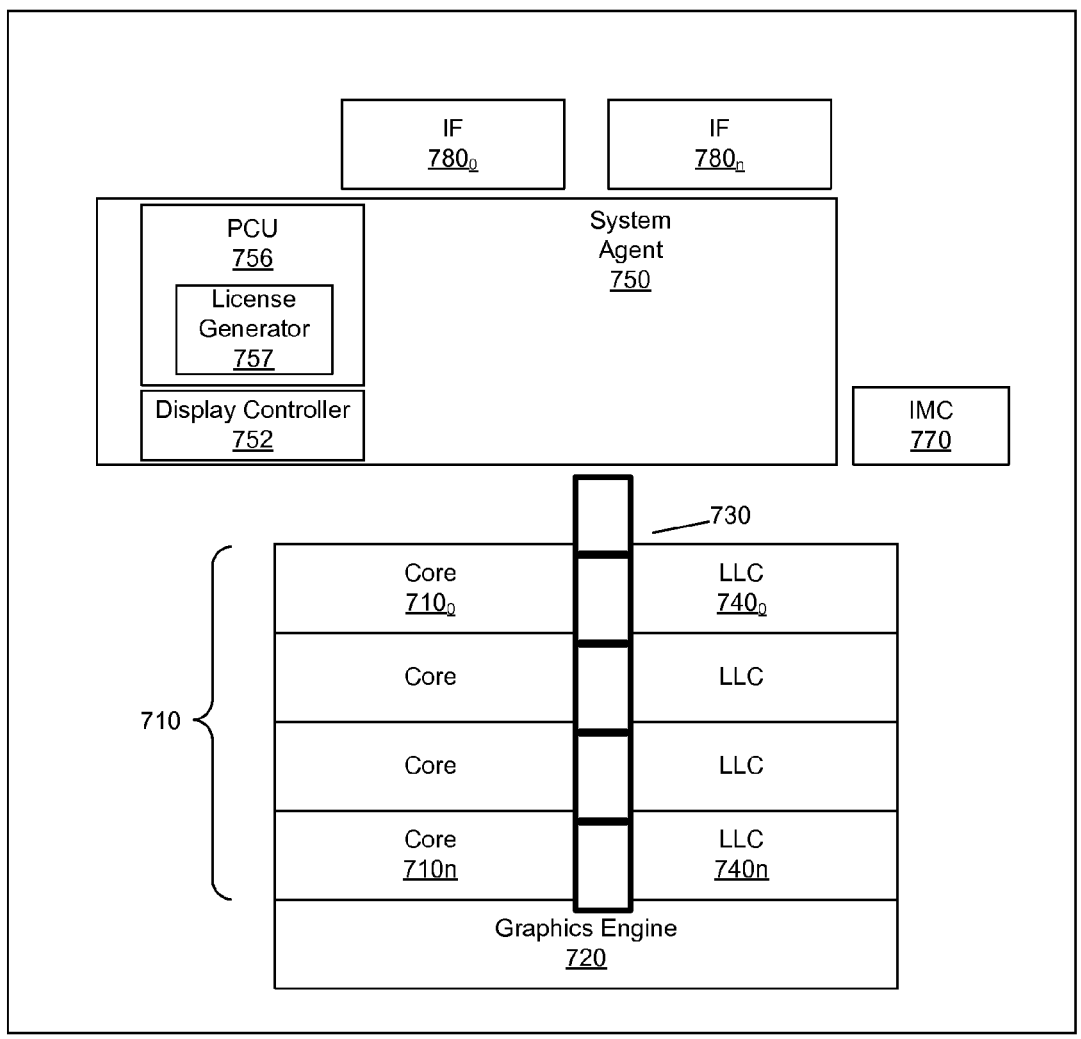
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and a system agent domain 750 may further be present. In various embodiments, system agent domain 750 may execute at a fixed frequency and may remain powered on at all times to handle power control events and power management such that domains 710 and 720 can be controlled to dynamically enter into and exit low power states. Each of domains 710 and 720 may operate at different voltage and/or power. Note that while only shown with three domains, understand the scope of the present invention is not limited in this regard and additional domains can be present in other embodiments. For example, multiple core domains may be present each including at least one core.

In general, each core 710 may further include low level caches in addition to various execution units and additional processing elements along with voltage drop detectors and transient current logic in accordance with an embodiment of the present invention. Similar voltage drop detectors and transient current logic can be implemented within the graphic engine(s) of graphics domain 720. In turn, the various cores may be coupled to each other and to a shared cache memory formed of a plurality of units of a LLC $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750.

As further seen, system agent domain 750 may include display controller 752 which may provide control of and an interface to an associated display. As further seen, system agent domain 750 may include a power control unit 755 to perform power management operations for the processor. In the embodiment of FIG. 7, power control unit 756 can include a license generator 757 to thus provide licenses to one or more of the cores, as discussed above.

As further seen in FIG. 7, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 7, understand the scope of the present invention is not limited in this regard.

Figure 8:
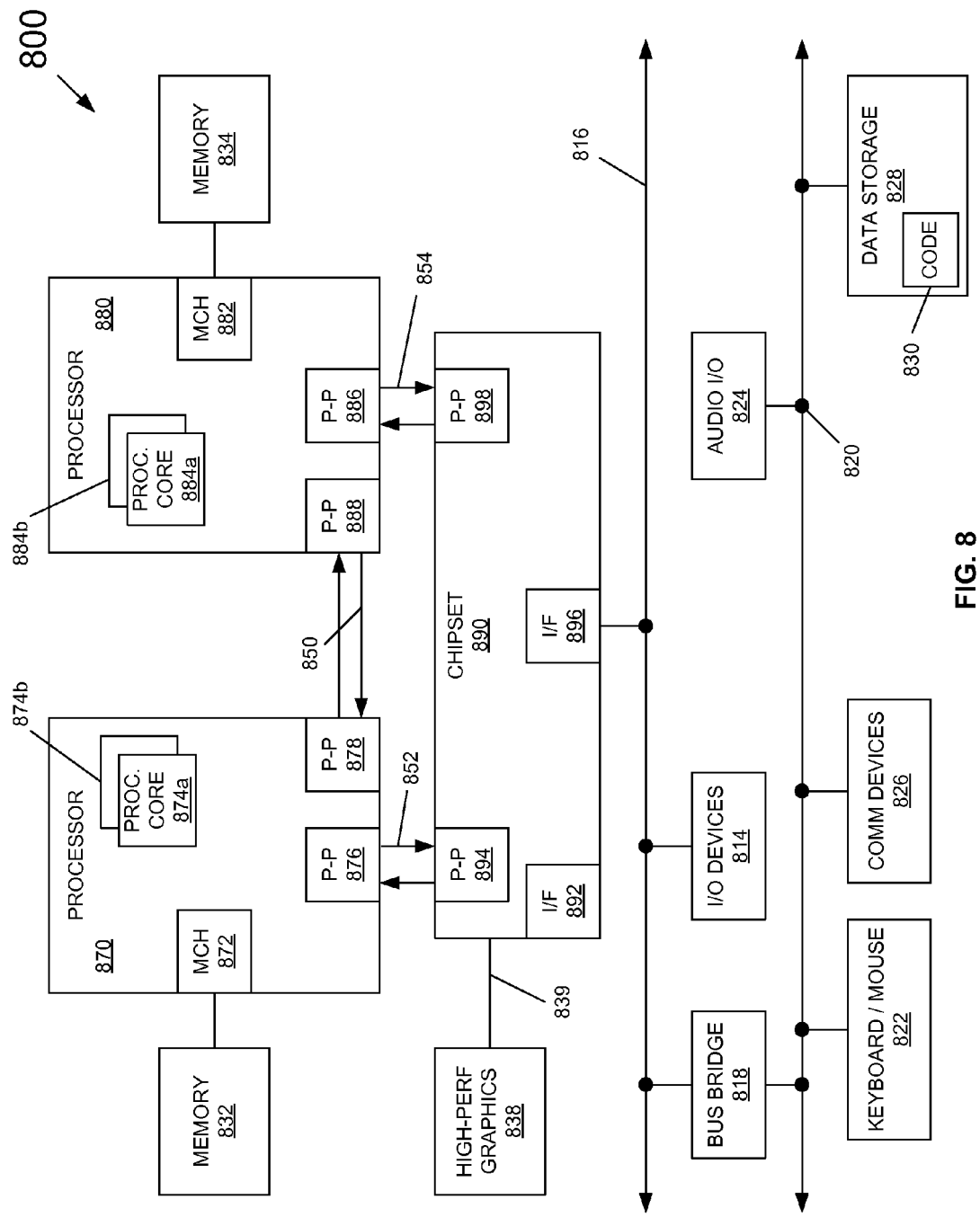
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Each of the processors can include transient current logic that can detect transient currents, e.g., based on the occurrence of various micro-architectural events and/or voltage droop detections and take appropriate action to control current consumption in a substantially instantaneous manner. In addition, the processors can further include a power controller to receive an indication when an excessive number of such current transients are occurring and to take a global action to reduce the number of current transients, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, ultrabook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a processor pipeline to execute instructions, the processor pipeline including a front end unit and at least one execution unit;
at least one voltage drop detector located within a core including the processor pipeline, the at least one voltage drop detector to output a voltage drop signal when a voltage detected by the at least one voltage drop detector falls below a threshold voltage; and
a logic coupled to receive the voltage drop signal from the at least one voltage drop detector and to control a micro-architectural parameter of at least one of the front end unit or the at least one execution unit responsive to receipt of the voltage drop signal, to manage power consumption of the processor pipeline, wherein the logic is to initiate a throttle event for at least one of the front end unit or the at least one execution unit responsive to the receipt of the voltage drop signal, update a current transient counter responsive to the throttle event initiation, and send a throttle overflow signal to a power controller of the processor when a value of the current transient counter exceeds a threshold, the throttle event corresponding to the micro-architectural parameter.

2. The processor of claim 1, wherein the throttle event is to throttle issuance of micro-operations from the front end unit.

3. The processor of claim 1, wherein the power controller is to update at least one operating parameter of the processor responsive to the throttle overflow signal, the at least one operating parameter comprising a guard band voltage at which the processor is to operate, the update to cause an increase to the guard band voltage.

4. The processor of claim 3, wherein a power state configuration of a voltage regulator to be coupled to the processor is to be updated responsive to the throttle overflow signal.

5. The processor of claim 1, wherein the logic is to identify a current transient responsive to receipt from the processor pipeline of an instruction of a selected type and to control the micro-architectural parameter responsive to the instruction receipt.

6. The processor of claim 1, wherein the at least one voltage drop detector is a micro-operation counter to maintain a count value of a number of micro-operations to be executed within the at least one execution unit in an evaluation interval, and wherein the logic is to control the micro-architectural parameter responsive to receipt of the counter value.

7. A system comprising:
a processor including a pipeline having a front end unit and at least one execution unit, the processor further including a current transient logic to identify a current transient and to control a micro-architectural parameter of at least one of the front end unit and the at least one execution unit responsive to the current transient identification, and a power controller coupled to the current transient logic to update an operating parameter of the processor if a threshold number of current transients is detected during an evaluation interval;
a voltage regulator coupled to the processor to provide an operating voltage to the processor; and
a dynamic random access memory (DRAM) coupled to the processor.

8. The system of claim 7, further comprising a plurality of voltage drop detectors located within a core including the pipeline, each of the plurality of voltage drop detectors to output a voltage drop signal when a voltage detected by the corresponding voltage drop detector falls below a threshold voltage.

9. The system of claim 7, further comprising at least one voltage drop detector located outside the processor to output a voltage drop signal when a voltage detected by the at least one voltage drop detector falls below a threshold voltage.

10. The system of claim 7, wherein the current transient logic is to identify the current transient responsive to receipt from the pipeline of an instruction of a selected type.

11. The system of claim 10, wherein the instruction of the selected type comprises an advanced vector extension (AVX) instruction of an instruction set architecture (ISA).

12. The system of claim 7, wherein the current transient logic is to identify the current transient responsive to receipt from the pipeline of an instruction to operate on operands of at least a threshold width.

13. A non-transitory machine-readable medium having stored thereon instructions, which if performed by a machine cause the machine to perform a method comprising:
identifying a current transient during operation of a processor having a front end unit and at least one execution unit;
controlling a micro-architectural parameter of at least one of the front end unit and the at least one execution unit responsive to the current transient identification; and
updating an operating parameter of the processor if a threshold number of current transients are detected during an evaluation interval.

14. The non-transitory machine-readable medium of claim 13, wherein the method further comprises:
maintaining a count value of a number of micro-operations to be executed within the at least one execution unit in an evaluation interval; and
controlling the micro-architectural parameter responsive to receipt of the counter value.

15. The non-transitory machine-readable medium of claim 13, wherein the method further comprises identifying the current transient responsive to an instruction of a selected type.

16. The non-transitory machine-readable medium of claim 15, wherein the instruction of the selected type comprises an advanced vector extension (AVX) instruction of an instruction set architecture (ISA).

17. The non-transitory machine-readable medium of claim 13, wherein the method further comprises identifying the current transient responsive to receipt of an instruction to operate on operands of at least a threshold width.

* * * * *